United States Patent [19]

Magneville

[11] Patent Number: 4,770,268

[45] Date of Patent: Sep. 13, 1988

[54] DEVICE FOR GENERATING ACOUSTIC WAVES BY MEANS OF A FALLING MASS STRIKING A TARGET ELEMENT ANCHORED IN A WELL

[75] Inventor: Pierre Magneville, Vernouillet, France

[73] Assignee: Institut Francais du Petrole, Malmaison, France

[21] Appl. No.: 37,854

[22] Filed: Apr. 13, 1987

[30] Foreign Application Priority Data

Apr. 11, 1986 [FR] France .................................. 86 05333

[51] Int. Cl.$^4$ ............................................. G01V 1/40
[52] U.S. Cl. ..................................... 181/106; 181/121; 367/911
[58] Field of Search ............... 181/102, 104, 105, 106, 181/113, 121, 401; 367/25, 35, 911; 73/1 R, 1 D, 1 DV; 175/1, 305, 306; 166/343, 250

[56] References Cited

U.S. PATENT DOCUMENTS 4,648,478 3/1987 Dedole et al. ...................... 181/106

FOREIGN PATENT DOCUMENTS 2552553 3/1985 France ................................. 181/106
799852 11/1968 Canada ................................ 175/306

Primary Examiner—Thomas H. Tarcza
Assistant Examiner—Ian J. Lobo
Attorney, Agent, or Firm—Antonelli, Terry & Wands

[57] ABSTRACT

A device is provided for generating acoustic waves by means of a falling mass striking a target element integral with rectractable anchorage means. The mass moves in an elongate body under the combined action of gravity and resilient means from a raised position to an impact position. Resetting, after the fall, is provided by raising the mass by means of a nut, held against rotation, using a threaded rod connected to reversible drive means and locking it in the high position either by means of a retractable bar tripped by the return of the nut to the low position or else by remote controlled magnetic means. The anchorage means include for example a "packer" and a resilient coupling means.

14 Claims, 4 Drawing Sheets

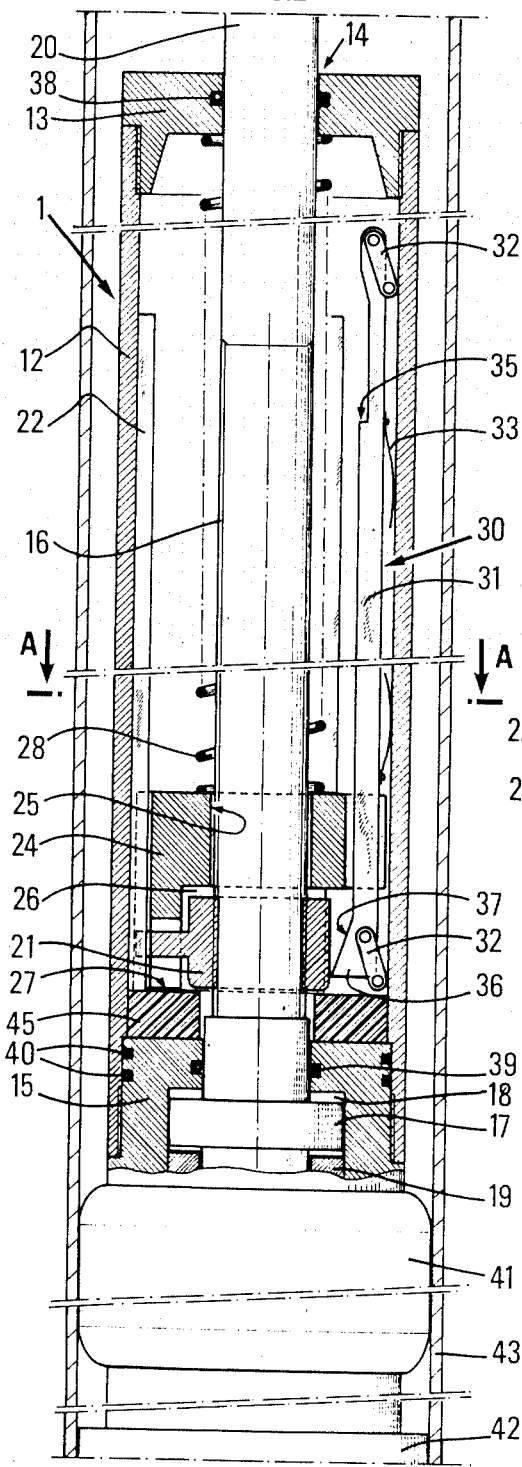
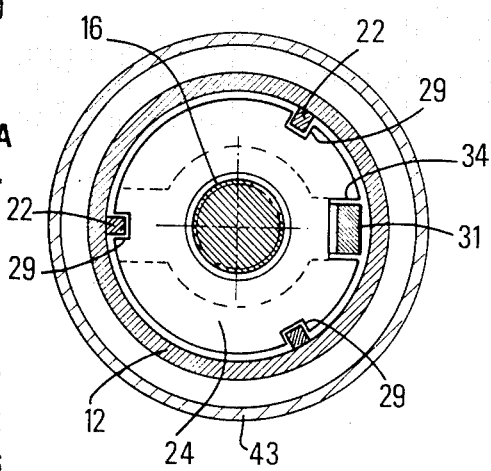
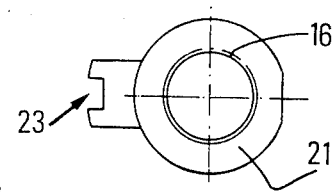

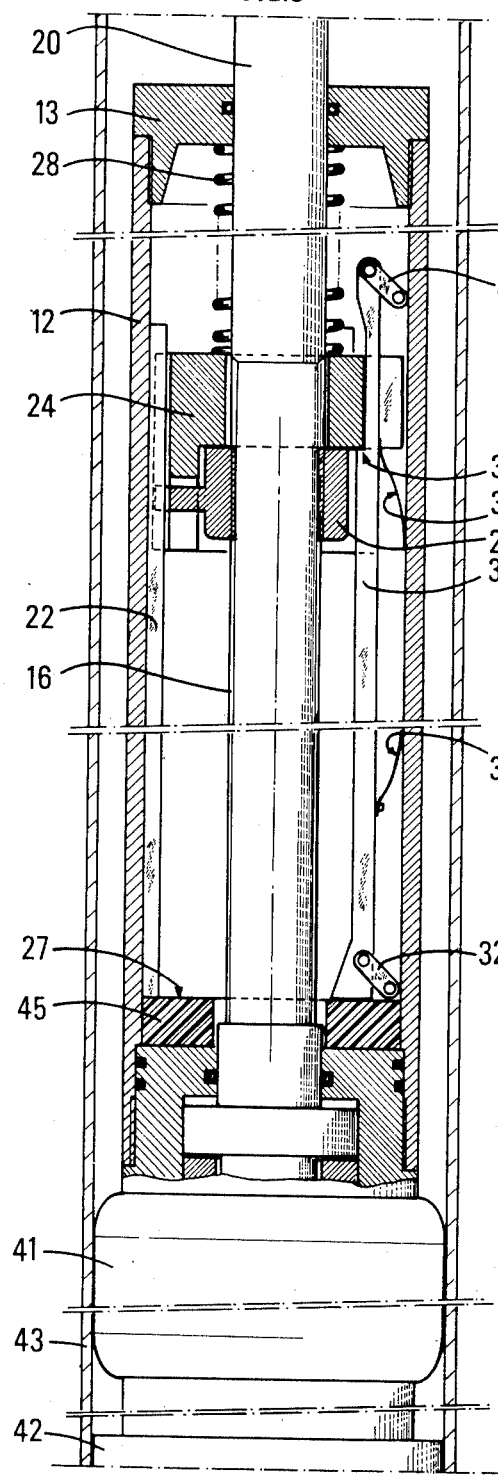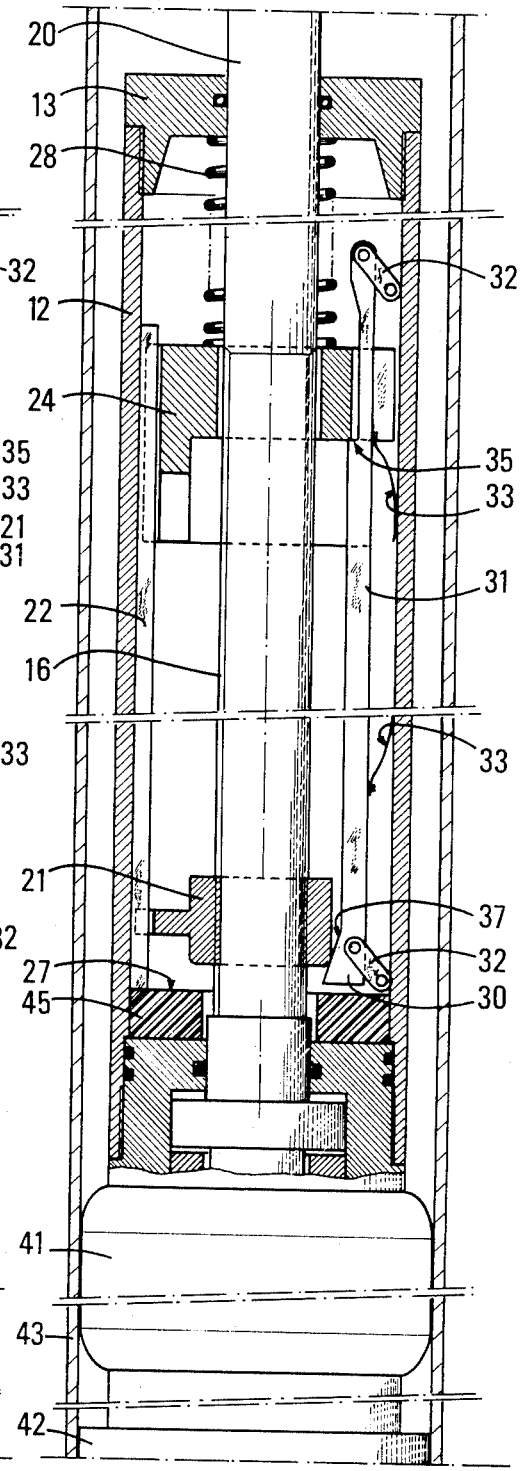

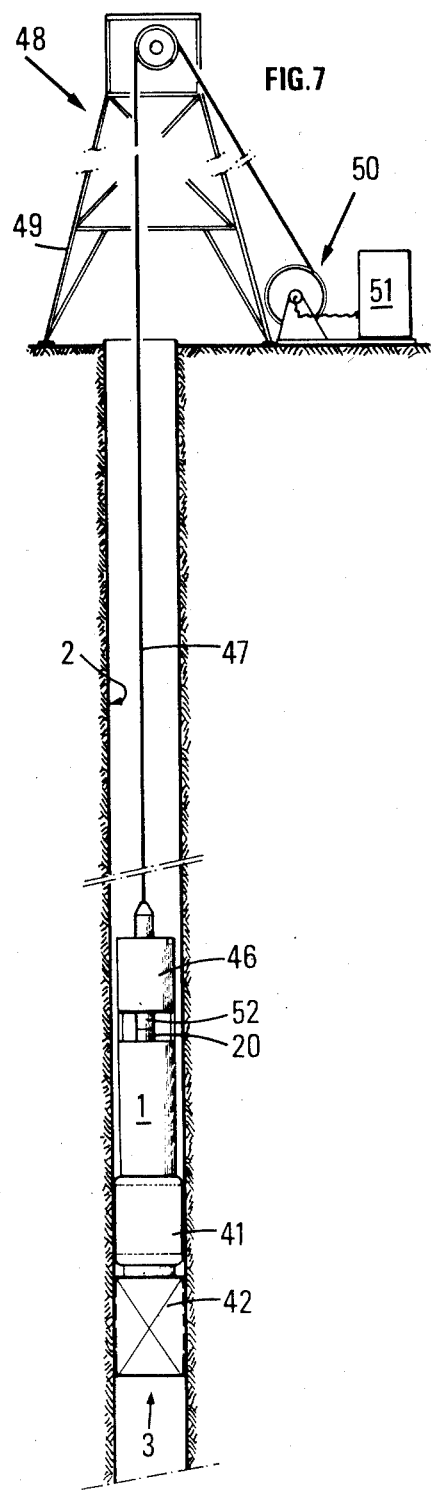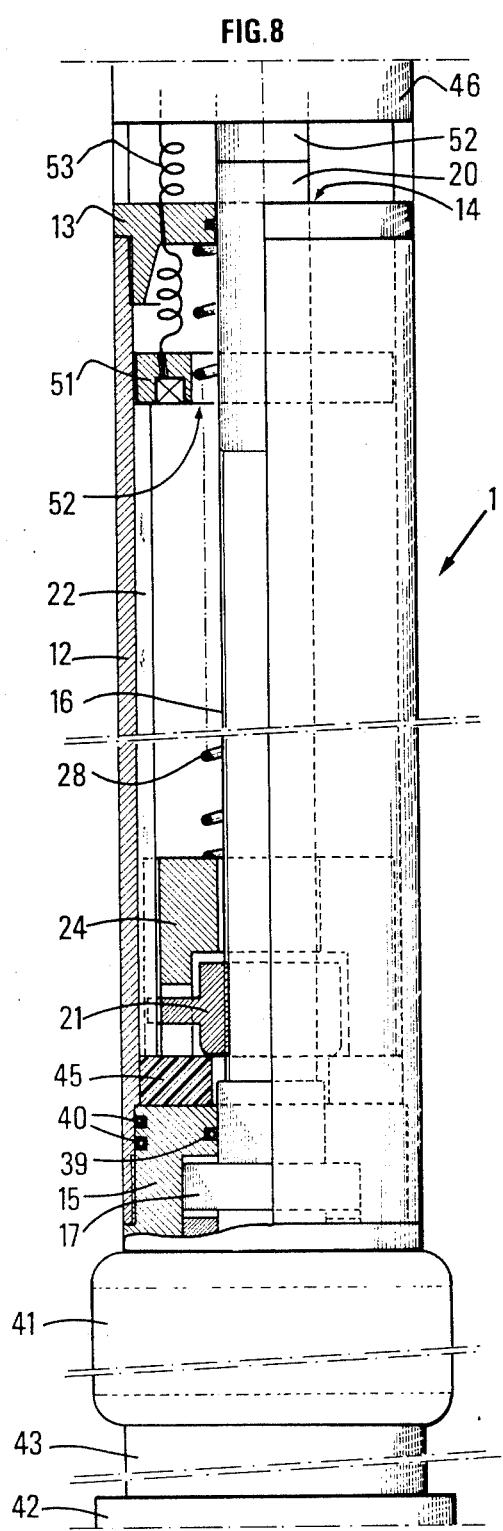

DEVICE FOR GENERATING ACOUSTIC WAVES BY MEANS OF A FALLING MASS STRIKING A TARGET ELEMENT ANCHORED IN A WELL

BACKGROUND OF THE INVENTION

1. Field of the Invention

The present invention relates to a device for generating acoustic waves by means of a falling mass striking a target element coupled to the wall of a well or drill hole, usable in particular in the field of land based seismic prospection.

2. Description of the Prior Art

A device is known for generating seismic impulses by means of a mass striking a target element anchored in a drill hole. The target element is secured to an elongate body which is provided with anchorage means.

The mass is movable in the body between a low position in contact with the target element and a high position from which its fall is initiated by the action of control means. These means include an element with retractable hooks capable of gripping an engagement piece integral with the mass and rigid traction elements (rods or string of interconnected rods) connected to lifting means disposed outside the well. The anchorage means are of the "packer" type well known to specialists and include an expandable member having a radially movable peripheral part and a central part.

Expansion is obtained by rotating the two parts with respect to each other by rotating the string of rods from the surface. The peripheral part may be formed of pivoting arms provided with claws which, by opening, anchor themselves in the wall of the well, or else of a deformable enclosure. Considering the method of operation of the device, the radial stresses are exerted alternately upwardly and downwardly on the anchorage means.

Upwardly, when the mass is raised by pulling the string of rods, because of the friction and the hydrostatic pressure reigning in the well. Downwardly, at the moment when the mass impacts the target element. With the anchorage means of the "packer" type used in practice, the body is immobilized by jamming anchorage arms against the wall of the well and the positions of the anchorage means where this occurs are not in general identical dependent on whether the body is being lowered or raised. The result is that the assembly is subjected to a shift during the same operating cycle, which causes damage to the walls and reduces the coupling coefficient.

Furthermore, the acoustic power emitted by this source depends on the falling height of the mass. For some applications in which the acoustic power required is high, a falling height of several meters may be required. The total height of the device may then be very great, which sometimes makes handling of it difficult.

The prior device is described in the French patent application EN. No. 85/17 832.

SUMMARY OF THE INVENTION

The device of the invention overcomes these drawbacks. It includes an elongate body to which the target element is fixed, the body guiding the mass between an impact position in contact with the target element and a raised position from which the fall is initiated, connection means for connecting the body to the surface and retractable anchorage means for intermittently coupling the device with the wall of the well. It further comprises means for translating the mass between its impact position and its raised position, these means including a threaded rod disposed along the axis of the body and a nut secured against rotation which is disposed under the mass and means for rotating the threaded rod alternately in one direction and in the opposite direction, and means for applying to the mass a force which is added to the force of gravity.

The means for rotating the threaded rod may for example include rigid elements connecting the threaded rod to drive means disposed on the surface. They may also include drive means integral with the body and adapted to be lowered therewith into the well, at the end of an electric carrier cable fed from a surface installation.

The means for applying to the mass a force which is added to the force of gravity include, for example, a spring or else a chamber containing a fluid, defined by walls of the body and a movable piston integral with the mass.

The use of means for translating the mass which consist essentially of a nut which raises the mass when it is moved by rotation of a rod, results in eliminating the axial stresses which, in the prior device, were directed upwardly. The only axial stresses which are exerted on the anchorage means are those which result from the impacts. The result is a better coupling of the device with the wall of the well and improved stability during the emission and resetting cycles. That further leads to a simplified construction.

The use of means for increasing the falling speed of the mass reduces the necessary stroke, for the same acoustic energy produced and consequently shortens the device.

The embodiment in which the drive means for rotating the threaded rod are also lowered into the well and fed through an electric carrier cable winding off a reel is particularly advantageous when the depth of use becomes appreciable where it allows the lowering and positioning operations to be speeded up.

The device also includes means for immobilizing the mass in the raised position, these means being tripped by the return of the nut to the vicinity of the impact position of the mass.

It may further include means for immobilizing the mass comprising a plate provided with magnetic means.

BRIEF DESCRIPTION OF THE DRAWINGS

Other features and advantages of the device of the invention will be clear to the reader from the following description of two particular embodiments, given by way of non limitative examples, with reference to the accompanying drawings in which:

FIG. 2 is a partial sectional view of the device in which the mass is in the impact position against the target element and the nut holds a locking bar retracted which forms a first embodiment of the immobilization means;

FIG. 3 shows diagramatically the device in cross section;

FIG. 4 is a diagramatical cross sectional view of the nut;

FIG. 5 is a view similar to FIG. 2 showing the mass in an intermediate position and the mechanical means for immobilizing the mass are in an advanced position;

FIG. 6 shows the device in its tripping position in which the mass is held in a notch of the locking bar and the nut has come back to the vicinity of its low position in engagement with a tripping pawl;

FIG. 7 shows a second embodiment of the device including electric drive means for rotating the threaded rod; and FIG. 8 is a partial sectional view of the inside of the body showing more particularly the magnetic means for immobilizing the mass intermittently in the high position.

DESCRIPTION OF THE PREFERRED EMBODIMENTS

Figure 1:
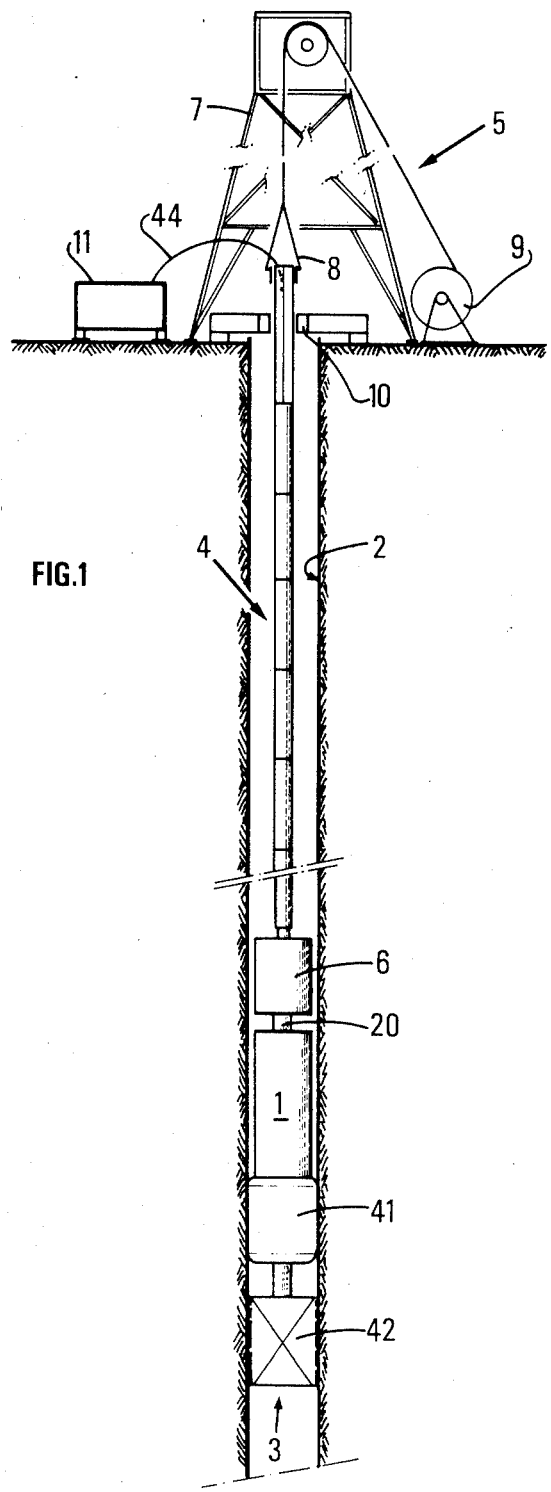
FIG. 1 shows diaqramatically the device inside a well, in a first embodiment.

The device shown in FIG. 1 includes a striker assembly 1 intended to be lowered into a well or drill hole 2, a coupling element 3 for immobilizing the striker element at a chosen depth, a rigid stringer 4 formed of a rod or a string of interconnected rods for supporting the structure thus formed and connecting it to an operating system 5 disposed on the surface, and a gear box 6 of known type interposed between stringer 4 and the striker assembly 1 and whose function will be described further on. The operating system 5 is of a known type in the drilling field and includes for example a derrick 7, means 8 for engagement with the stringer, connected by cables to a lifting system 9 and a revolving table 10 associated with drive means (not shown) for rotating stringer 4.

The coupling element 3 is of the "packer" type also well known in the well drilling field. A "packer" is for example used having a deformable enclosure which may be inflated by injection of a pressurized liquid. This liquid is fed to the deformable enclosure from the surface through the tubular stringer 4. The pressurized liquid is delivered by a hydraulic system 11 also of a known type.

The striking assembly 1 includes (FIGS. 2 to 5) a cylindrical body 12 ending at a first end in a wall 13 formed with an axial opening 14 and closed at its opposite end by an inserted piece 15 which forms the target element or anvil. A threaded rod 16 is disposed along the longitudinal axis of body 12. It includes a head 17 freely rotatable on itself in a cavity 18 of the target element and secured thereto for translation by fixing means 19.

It passes through opening 14 at the first end of the body and is connected to the output shaft 20 of the gear box 6 (FIG. 1). Controlled from the surface installation, box 6 may either transmit the rotational movement of stringer 4, or reverse it. Depending on the case, the output shaft 20 of the gear box 6 may therefore rotate rod 16 either in one direction or in the opposite direction. On the threaded rod 16 is screwed a nut 21. Slides 22 (FIG. 3) are fixed to the inner wall of the body along generatrices thereof. Nut 21 has at least one radial notch 23 adapted for bearing on one of the slides 22, which prevents it rotating on itself. Rotation of the threaded rod 16 in one direction then in the opposite direction causes the nut to rise and causes it to descend. On the side of the nut opposite the target element 15, is disposed a mass 24 (or hammer) formed of a cylindrical piece with, along its longitudinal axis, a bore 25 of a section greater than that of the threaded rod 16.

The mass has a recess 26 of dimensions greater than those of the nut. Thus, its lower face 27 may come freely into contact with the facing wall of the target element 15 when the nut 21 is brought to the low position in the vicinity thereof. Inside the body, between the opposite (or upper) face of the mass and the end wall 13 is disposed a spring 28 which is compressed when the mass is moved away from the target element.

Mass 24 also includes notches 29 for the slides 22 which guide it in its movements inside the body.

The device also includes retractable means 30 for immobilizing the mass in a tripping position where the spring 28 is highly compressed, these means being controlled by the movements of the mass and the nut inside body 12. They include a bar 31 disposed along a generatrix of the body, inside this latter, which bears at its base on the target element 15. Two parallel arms 32 of equal length connect the bar 31, in the vicinity of its ends, to the inner wall of the body.

Springs 33 are disposed between the wall of the body and the bar, for holding them apart from each other, in the absence of a radial thrust. The mass is provided with a groove 34 (FIG. 3) at the bottom of which the bar bears. A notch 35 is formed in this latter facing the tripping position or high position of the mass 24. The depth of groove 34 and that of notch 35 are chosen so that the bar is held apart by the mass, with springs 33 compressed, except when the mass reaches its high position and is engaged in said notch 35.

The mass is tripped by the action of nut 21 on bar 31. This latter has a widened base 36 whose upper wall 37 is slanted upwardly, which serves as trigger.

The dimensions are chosen so that nut 21, in the immediate vicinity of the target element 15, bears against the sloping wall 37 of the trigger and pushes bar 31 back towards its retracted position far enough for the mass to be released from the retaining notch 35.

Seals 38, 39, 40 are disposed in the end wall 13 and in the target element 15, around the threaded rod 16 and also between the wall of the body of the target element for isolating the inside of the body from the well.

At its base, the target element is fixed to a deformable coupling element 41, itself connected to an anchorage element of the "packer" type 42. The anchorage element 42 includes for example a variable volume enclosure which is applied against the wall of the well (case of FIG. 1) or against the wall of a csing 43, when the device is lowered into a cased drill hole (case of FIGS. 2, 5 and 6), by injecting a pressurized liquid supplied by the hydraulic system 11 (cf. FIG. 1) through duct 44 and the tubular stringer 4.

The section of the deformable coupling element 41 is chosen so that it is intimately applied against the wall of the well or casing 43 when, with the anchorage element expanded, the weights of the device and stringer 4 are applied thereto. This coupling element may be formed by a liquid filled enclosure or else be in the form of a plug of a resilient material disposed between two plates whose spacing apart can be varied by rotating the threaded rod.

A disk 45 made from a shock absorbing material such as polyurethane for example is disposed advantageously on the upper wall of the target element so as to absorb the shock of the impacts of mass 24.

The device operates in the following way:

the anchorage element 42 is actuated so as to immobilize the device at a given depth where it is to be tripped.

With the gear box 6 (FIG. 1) controlled so as to provide direct transmission, the drive means are actuated so as to rotate the revolving table 10 and consequently stringer 4, the output shaft 20 and the threaded rod 16.

Nut 21, secured against rotation by at least one of the slides 22, moves upwards, that is to say towards the end wall 13 of the body, from its low position shown in FIG. 1 and drives the mass in its movement. On leaving this low position it ceases to bear on trigger 36 and the springs 33 return the bar 31 to its spaced apart position (FIG. 5) it then bears against the bottom of groove 34 formed in the mass.

The mass arrives in the high position or tripping position shown in FIG. 5, at the level of notch 35 in bar 31. Under the action of the return springs 33, the bar moves away from the wall and its notch 35 is engaged under the mass, which holds it in the high position.

The gear box 6 is controlled so as to reverse the direction of rotation of the output shaft 20 and the table 10 is again actuated for rotating stringer 4. The reversal of the direction of rotation causes nut 21 to descend which returns to its low position, leaving the mass suspended in the notch 35 of bar 31.

When the nut has come back to the vicinity of its low position (FIG. 6) it comes into contact with surface 37 of trigger 36 and moves it away laterally. When it is moved sufficiently away, the mass is released from the upper notch 35 and falls, propelled by spring 28 towards its low or impact position in which it strikes the target element with force. An axial impulse is applied to the coupling element 41. Since this is made from a resilient material and so substantially incompressible, the axial compression resulting from the impact results in a corresponding radial expansion.

A radial seismic pulse is thus applied to the formation surrounding the well. Another emission cycle may then begin.

In the case where the anchorage element or "packer" is of the expandable enclosure type, it may alone provide the acoustic coupling of the device with the walls of the well and, in this case, the coupling element 41 may possibly be omitted. But this element proves indispensable if the device is connected to an anchorage element of a different type whose anchorage surface is too reduced to alone provide sufficient acoustic coupling. That may be the case more particulary of certain packers with retractable claws In a second particularly advantageous embodiment, when the depth of use becomes relatively high, the device includes (FIGS. 7, 8) a striker assembly 1 intended to be lowered into the well or drill hole 2, a coupling element 3 for immobilizing the striker assembly at a chosen depth and electric drive means 46 disposed in a tubular element fixed to the upper part of the striker assembly 1.

This latter is connected by an electric-carrier cable 47 to a support and lifting assembly 48 disposed on the surface. This assembly 48 includes for example a derrick 49, a winch system 50 on which the electriccarrier cable 47 is wound and an electric generator 51 for the electric supply of the cable.

As in the embodiment shown in FIGS. 2 to 6, the device includes a cylindrical body 12 ending at a first end in a wall 13 provided with an axial opening 14 and closed at its opposite end by a detachable piece 15 forming the target element. A threaded rod 16 integral with the target element in translation, at a first of its ends, passes through the axial opening 14 at its opposite end and is connected to the shaft 52 of the upper electric drive means 46. On the threaded rod 16 is screwed a nut 21 which slides 22 fixed to the inner wall of the body along generatrices prevent from rotating. Rotation of the threaded rod in one direction and in the opposite direction causes the nut to move up or move down.

Above the nut, on the side thereof opposite the target element, is disposed a mass 24 movable along the threaded rod, by the rise of the nut therealong. Similarly, a spring 28, compressed when the mass moves away from the target element, applies an additional acceleration to the mass during its fall.

This embodiment differs essentially from the preceding one by the means for intermittently immobilizing the mass in the high position. These means include a magnetic plate of known type 51 having permanent magnets and electric coils such that the application of an electric current to these coils demagnetizes the magnets and cancels out the retaining force exerted by the plate. This plate, which has a central passage 52 for the threaded rod 16 and spring 28, is fixed to the wall of the body 12 in the vicinity of the high position of the mass. The electric cables 23, connect the magnetic plate 51 to the inside of compartment 46 where they are connected to the electric-carrier cable 47 (FIG. 7). The device includes, as in the preceding embodiment, a deformable coupling element 41 and an anchorage element 42 of the electric control type, so as to be actuated by an electric control applied to the electric-carrier cable 47.

The device operates in the following way:

by unwinding the winch 50, the device is lowered into the well at the end of its electric-carrier cable 47. Having reached the chosen depth, the anchorage element 42 is caused to anchor to the wall of the well and the electric motors 46 are actuated so as to rotate the threaded rod 60 in a direction such that nut 21 rises. Mass 24 is driven towards its high position where it is applied against the magnetic plate which holds it.

The electric motors 46 are then controlled so as to bring nut 21 back to its low position (shown in FIG. 8) by rotation of the threaded rod 16.

Tripping of the seismic source is controlled from the surface by application, to the magnetic plate 51, of demagnetization currents. This method of intermittenly immobilizing the mass in the high position means that the time of tripping the seismic source is known with great accuracy.

Still within the scope of the invention, spring 28 may be replaced by any equivalent resilient means, in particular a volume of gas compressed by the translation of the mass to its tripping position, this volume of gas being contained for example in a chamber defined by walls of the body and a movable piston integrally secured to the mass. Similarly, the demagnetizable permanent magnets may be replaced by electromagnets activated by application of an electric current.

What is claimed is:

1. A device for generating acoustic waves in a well by a falling mass striking a target element coupled to a wall of the well, including an elongate body to which the target element is fixed, the body guiding the mass between an impact position in contact with the target element and a raised position from which the fall is initiated, connection means for connecting the body to the surface and retractable anchorage means for intermittingly coupling the device to the wall of the well, and means for translating the mass between said impact position and said raised position, said translating means including a threaded rod disposed along the axis of the body and a nut secured against rotation which is disposed under the mass and means for rotating the threaded rod alternatively in one direction and in the opposite direction to raise and to lower the nut respectively.

2. A device for generating acoustic waves in a well by a falling mass striking a target element coupled to a wall of the well, including an elongate body to which the target element is fixed, the body guiding the mass between an impact position in contact with the target element and a raised position from which the fall is initiated, connection means for connecting the body to the surface and retractable anchorage means for intermittingly coupling the device to the wall of the well, means for translating the mass between said impact position and said raised position, said translating means including a threaded rod disposed along the axis of the body and a nut secured against rotation which is disposed under the mass and means for rotating the threaded rod alternatively in one direction and in the opposite direction and means for applying to the mass a resilient force which is added to the force of gravity; said means for rotating the threaded rod including a rigid stringer connecting the threaded rod to drive means disposed on the surface.

3. A device for generating acoustic waves in a well by a falling mass striking a target element coupled to a wall of the well, including an elongate body to which the target element is fixed, the body guiding the mass between an impact position in contact with the target element and a raised position from which the fall is initiated, connection means for connecting the body to the surface and retractable anchorage means for intermittingly coupling the device to the wall of the well, means for translating the mass between said impact position and said raised position, said translating means including a threaded rod disposed along the axis of the body and a nut secured against rotation which is disposed under the mass and means for rotating the threaded rod alternatively in one direction and in the opposite direction and means for applying to the mass a resilient force which is added to the force of gravity; said means for rotating the threaded rod including drive means fastened to the body and an electric-carrier cable cooperating with a lifting system for lowering the device into the well and controlling the drive means for rotating said threaded rod.

4. The device as claimed in claim 1, further comprising means for applying to the mass a resilient force which is added to the force of gravity, said means for applying to the mass a force which is added to the force of gravity including resilient means compressed by the movement of the mass towards said raised position.

5. The device as claimed in claim 4, wherein said resilient means include a spring housed inside the body.

6. The device as claimed in claim 4, wherein said resilient means include a gaseous mass compressed by the translation of the mass to its tripping position.

7. The device as claimed in claim 1, further including means for immobilizing the mass in the raised position said means being tripped by the return of the nut to the vicinity of the impact position of the mass.

8. A device for generating acoustic waves in a well by a falling mass striking a target element coupled to a wall of the well, including an elongate body to which the target element is fixed, the body guiding the mass between an impact position in contact with the target element and a raised position from which the fall is initiated, connection means for connecting the body to the surface and retractable anchorage means for intermittingly coupling the device to the wall of the well, means for translating the mass between said impact position and said raised position, said translating means including a threaded rod disposed along the axis of the body and a nut secured against rotation which is disposed under the mass and means for rotating the threaded rod alternatively in one direction and in the opposite direction means for applying to the mass a resilient force which is added to the force of gravity, and means for immobilizing the mass in the raised position, said immobilization means being tripped by return of the nut to the vicinity of the impact position of the mass; and said immobilization means including at least one readily movable bar having a notch for locking the mass in said raised position and a widened base on which the nut bears, in the vicinity of the impact position of the mass.

9. The device as claimed in claim 1, wherein said target element is connected to said anchorage means by resilient coupling means adapted to be applied against the walls of the well.

10. The device as claimed in claim 9, wherein said coupling means include a pad made from a resilient material.

11. The device as claimed in claim 9, wherein said coupling means include a sealed enclosure containing a fluid.

12. The device as claimed in claim 1, further comprising magnetic means for immobilizing the mass in the raised position.

13. The device as claimed in claim 1, further comprising means for immobilizing the mass in said raised position and for initiating the fall from said raised position when the nut is lowered to the vicinity of the impact position of the mass.

14. The device as claimed in claim 13, wherein said means for immobilizing the mass in the raised position comprises magnetic means operatively associated with a control means on the surface.

* * * * *